(12) United States Patent
Liao

(10) Patent No.: US 6,826,994 B1
(45) Date of Patent: Dec. 7, 2004

(54) BREAKING-LINE CUTTING MACHINE FOR THE TWIST-OFF BOTTLE CAP

(76) Inventor: Chi-Ti Liao, P.O. Box 697, Feng-Yuan City, Taichung Hsien (TW), 420

( * ) Notice: Subject to any disclaimer, the term of this patent is extended or adjusted under 35 U.S.C. 154(b) by 0 days.

(21) Appl. No.: 10/323,813

(22) Filed: Dec. 20, 2002

(51) Int. Cl.$^7$ ................................................ B26D 3/08
(52) U.S. Cl. ............................ 83/879; 83/946; 425/291
(58) Field of Search ........................ 83/879, 880, 946, 83/54, 882, 883; 264/138, 154, 268; 215/252, 253; 425/291, 809; 413/10, 12, 67

(56) References Cited

U.S. PATENT DOCUMENTS

| | | | | |
|---|---|---|---|---|
| 4,904,435 A | * | 2/1990 | Babcock et al. ............. | 264/154 |
| 5,488,888 A | * | 2/1996 | Kowal ........................ | 83/880 |
| 5,522,293 A | * | 6/1996 | Ingram ....................... | 83/54 |
| 5,557,999 A | * | 9/1996 | Smith et al. ................. | 83/880 |
| 5,564,319 A | * | 10/1996 | Kowal ........................ | 83/946 |
| 5,636,958 A | * | 6/1997 | Foldesi et al. .............. | 413/10 |
| 5,651,299 A | * | 7/1997 | Boyle et al. ................ | 83/880 |
| 5,809,860 A | * | 9/1998 | Haaser ....................... | 83/880 |
| 5,916,342 A | * | 6/1999 | Ingram ....................... | 413/10 |
| 5,937,726 A | * | 8/1999 | Spatz et al. ................. | 83/880 |
| 5,964,139 A | * | 10/1999 | Spatz et al. ................. | 83/879 |

* cited by examiner

*Primary Examiner*—Stephen Choi

(57) ABSTRACT

A breaking-line cutting machine for the twist-off bottle cap includes a main mechanism having an input tray, an output tray, a cutting set and a plurality of rotary components to pick up the unfinished bottle caps from the input tray to the cutting set for cutting the dashed breaking-line at there and delivering the finished bottle caps to the output tray, a semi-finished product feeding system to feed the unfinished bottle caps into the input tray and finished product container receives the finished bottle caps from the output tray via a conveyer. It is characterized in the introrsely curved inner edge of the cutting set by which the contact area between cutting set and the bottle cap is enlarged in order to make a precise and neat dashed breaking-line in the cap.

6 Claims, 9 Drawing Sheets

US 6,826,994 B1

BREAKING-LINE CUTTING MACHINE FOR THE TWIST-OFF BOTTLE CAP

BACKGROUND OF THE INVENTION

The present invention relates to cutting machines and more particularly to a breaking-line cutting machine for the twist-off bottle cap.

Nowadays, the manufacturers of milk or other beverages mostly adopt a twist-off cap 1 (as shown in FIG. 9) which has a dashed breaking-line 2 around a periphery.

When an user twists the cap counterclockwise, the dashed breaking-line is broken off and the bottle is opened. The dashed breaking-line is made with a breaking-line cutting machine.

Due to the out curved blade, the contact area between the blade and cap is rather small that is unfavorable for the quality control. Besides, the cutting speed is rather slow and sometimes the caps enter at the wrong side.

SUMMARY OF THE PRESENT INVENTION

The present invention has a main object to provide a breaking-line cutting machine for the twist-off bottle cap which machine is fully automatic and adopts transverse cutting method so as to provide a high cutting speed favorable for mass production and low breakdown rate.

Another object of the present invention is to provide a breaking-line cutting machine for the twist-off bottle cap in which the blade of a cutting set is introrsely curved that provides a swiftly, precisely and safely cutting of the twist-off caps and insures a good quality. When opens the door of a transparent guard, the machine will be totally stopped in order to safeguard the safety of the operator.

Accordingly, the breaking-line cutting machine for the twist-off bottle cap comprises generally an input system, an output system and a main mechanism which is comprised of a stand in which a motor is disposed, a central shaft projected upward from the top of the stand, a plurality of rotary disks spacedly secured on the shaft, a plurality of tubular posts spacedly and vertically connected between the rotary disks, a plurality of rotary posts slidably inserted into the tubular posts and a cutting set disposed on one side of a stationary disk.

The present invention will become more fully understood by reference to the following detailed description thereof when read in conjunction with the attached drawings.

DETAILED DESCRIPTION OF THE PREFERRED EMBODIMENT

Figure 1:
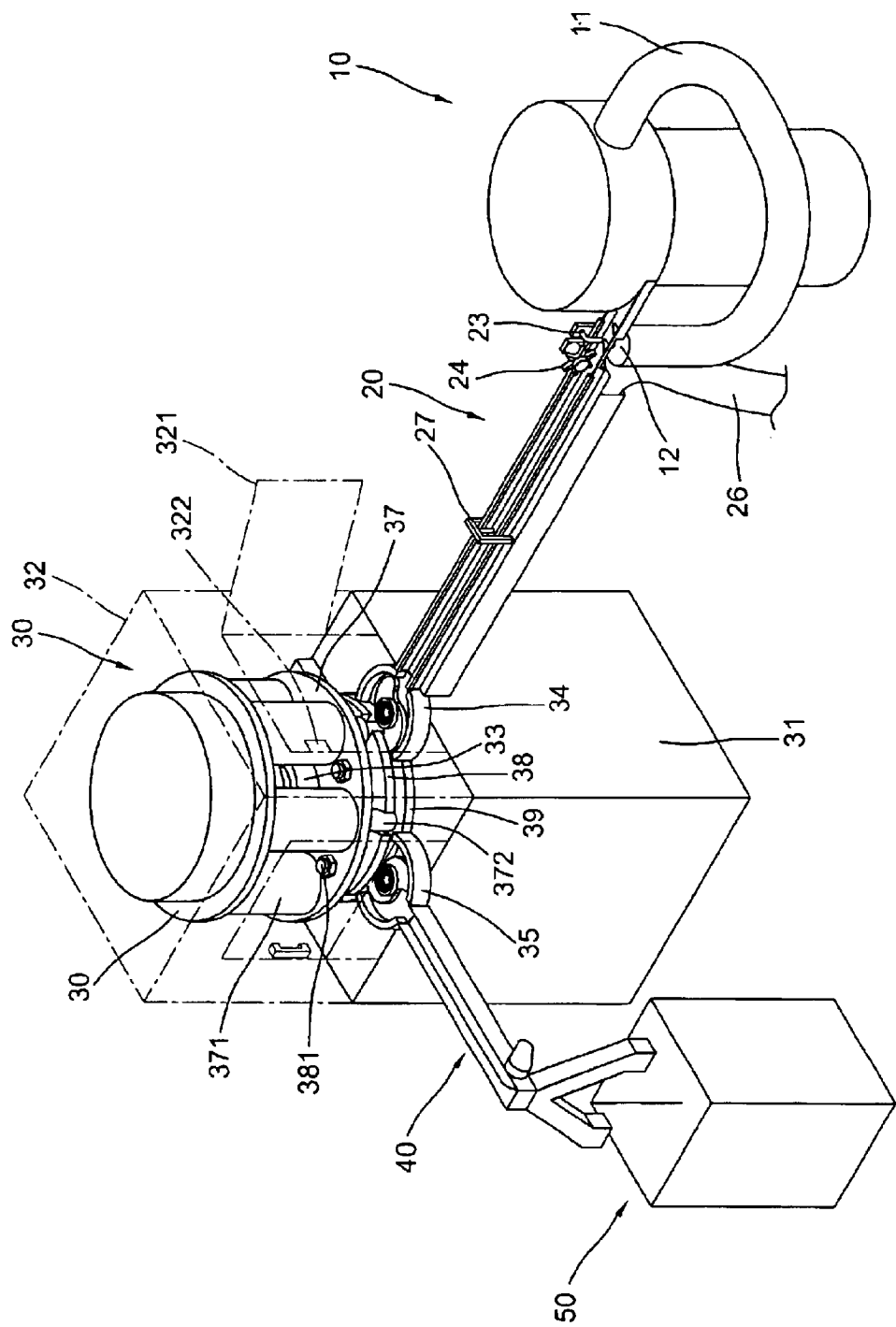
FIG. 1 is a perspective view showing the preferred embodiment of the breaking-line cutting machine of the present invention.
Figure 2:
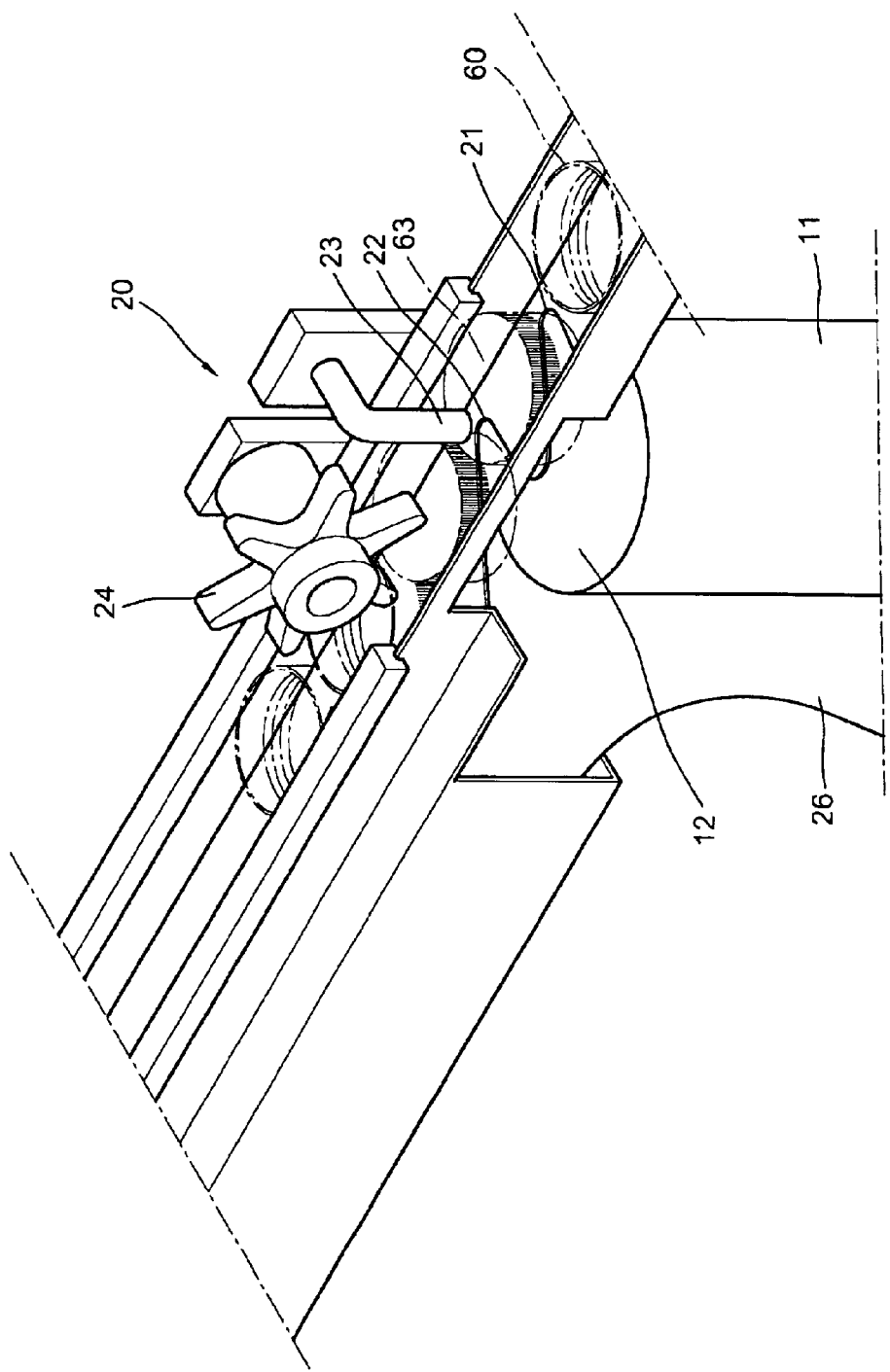
FIG. 2 is a perspective view showing that the caps on the input guide are selected by a rotor and a blow-pipe.
Figure 3:
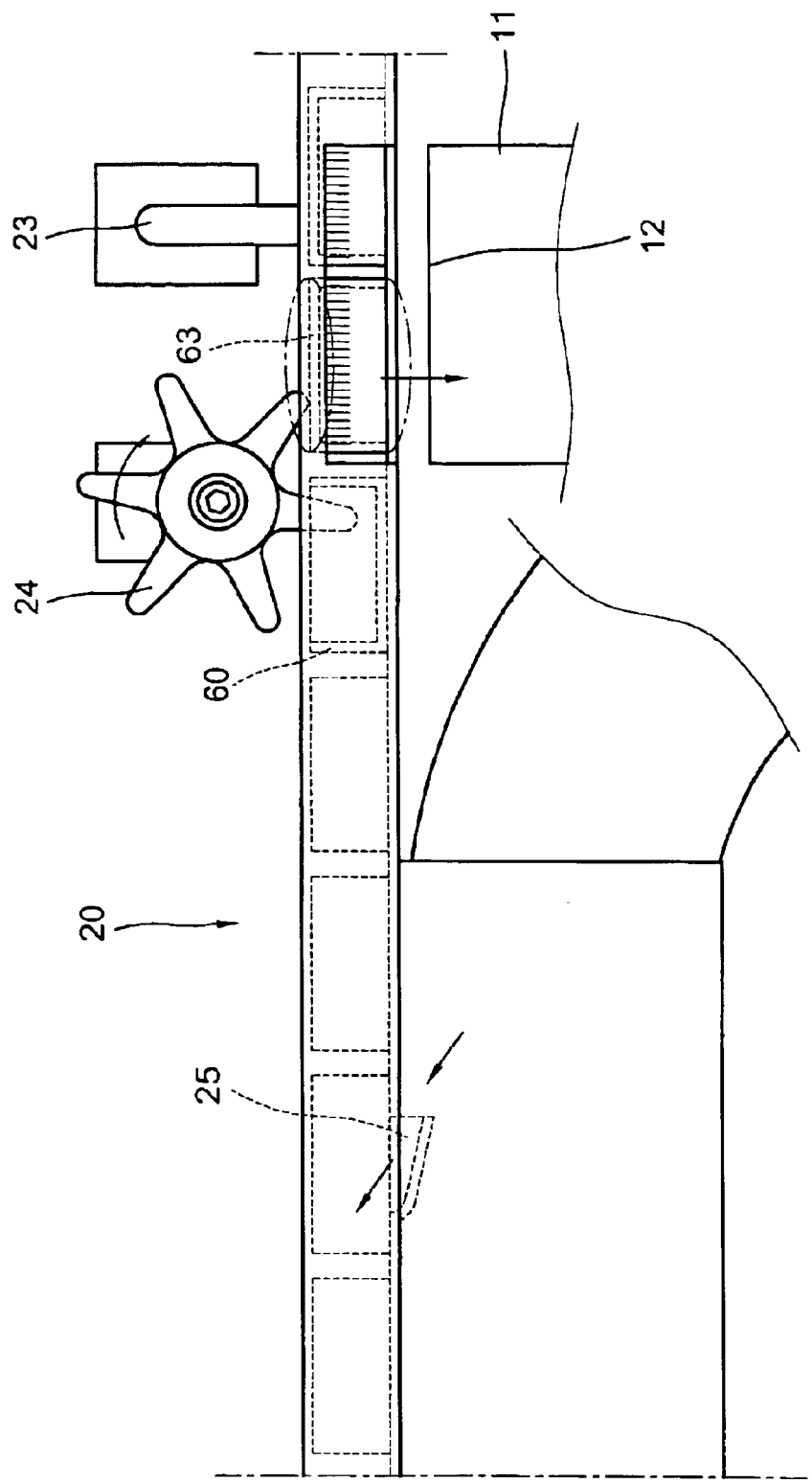
FIG. 3 is a side view of FIG. 2.

With reference to FIGS. 1, 2 and 3, of the drawings, the breaking-line cutting machine of the twist-off bottle cap of the present invention comprises generally a semi-finished product feeder 10, an input guide 20, a main mechanism 30, a conveyer 40 and a finished product container 50.

The semi-finished product feeder 10 contains a lot of unfinished twist-off caps 60 and feeds the caps 60 one by one into the input guide 20 and has a feed-back pipe 11 which connects to an upper periphery of the feeder 10 and has an opening 12 in the free end positioned under the input guide 20 for receiving the upset caps retaining back to the feeder 10. The seeding mechanism inside the feeder 10 is of a conventional art and is therefore not redundantly described.

Figure 4:
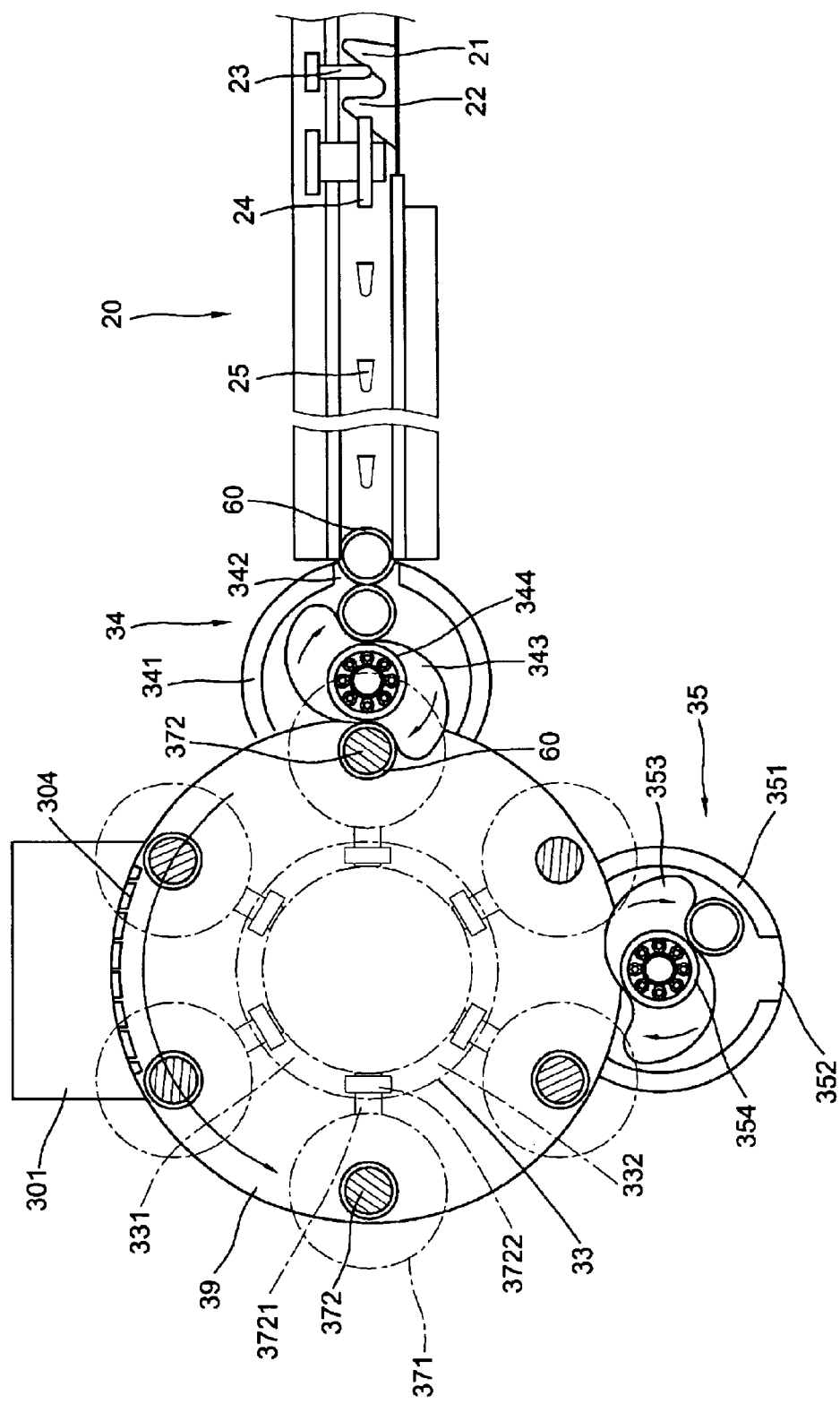
FIG. 4 is a plane view showing that an input tray is operated in cooperation with the input guide and the main mechanism to push the caps into the main mechanism of the machine.

The input guide 20 is disposed between the feeder 10 and the main mechanism 30 and has a pair of first and second V-shaped through holes 21 and 22 spacedly formed above the opening 12 of the feed-back pipe 11, a blow-pipe 23 above the first V-shaped through hole 21 and toward downward to provide predetermined air pressure to press the upset caps 60 into the opening 12 through the V-shaped through hole 21, a rotor rotatably disposed above the second V-shaped through hole 22 and having six radial arms of predetermined length for pressing the upset caps 60 (the opening of the cap 60 is toward downward) into the opening 12 of the feed-back pipe 11 and pushing the qualified caps 60 to move forward, a plurality of roughly U-shaped air vents 25 spacedly and centrally formed in the bottom of the input guide 20 (as shown in FIGS. 3 and 4) for driving the caps 60 to move forward to the main mechanism 30 an air transmission pipe 26 under the input guide 20 to supply the air to the air vents 25 and a sensor 27 on a top of the input guide 20 to measure the moving speed and to count the number of the caps that passed through.

Figure 5:
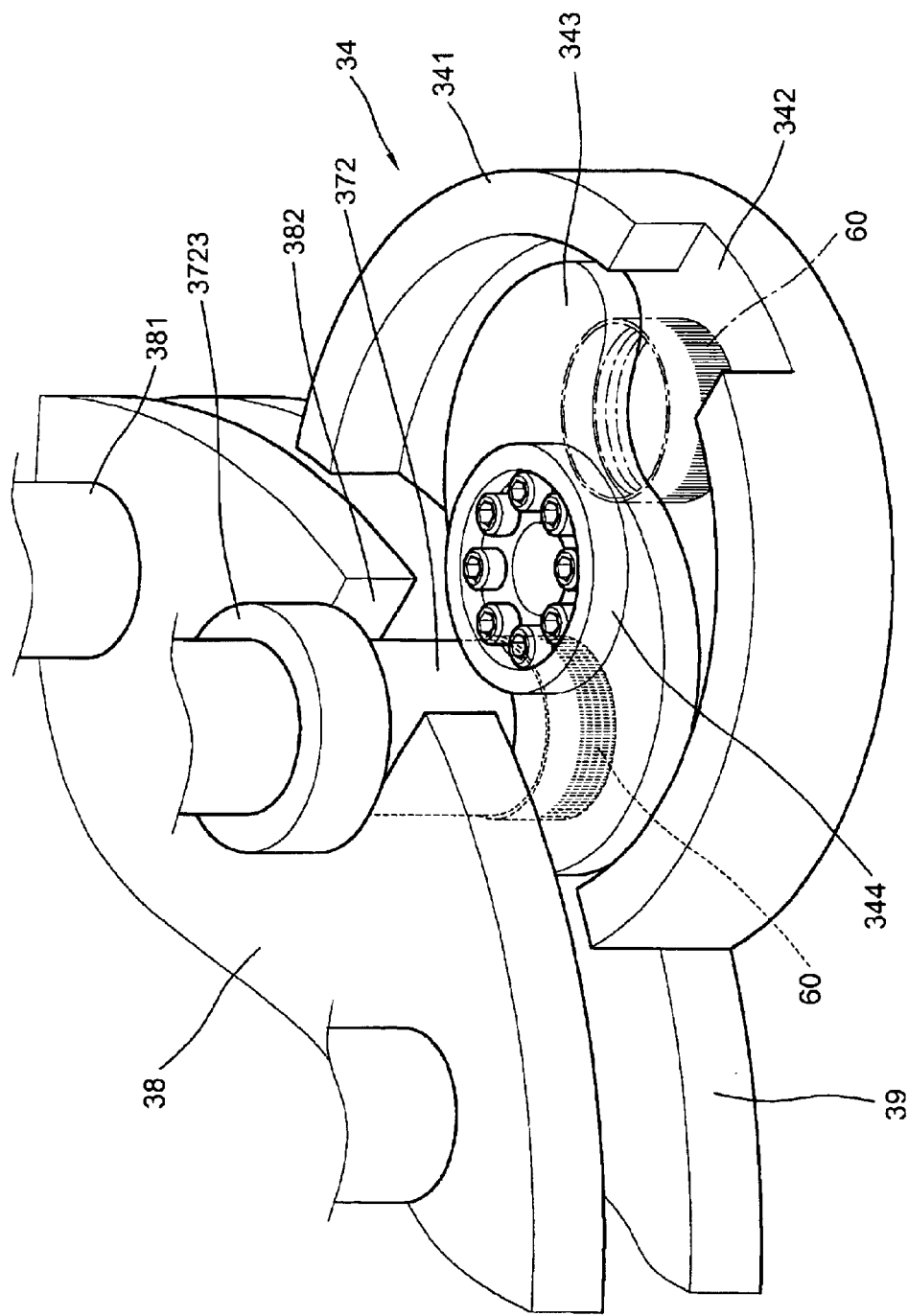
FIG. 5 is a perspective view showing that the input tray is operated in cooperation with a rotary post of the main mechanism.
Figure 6:
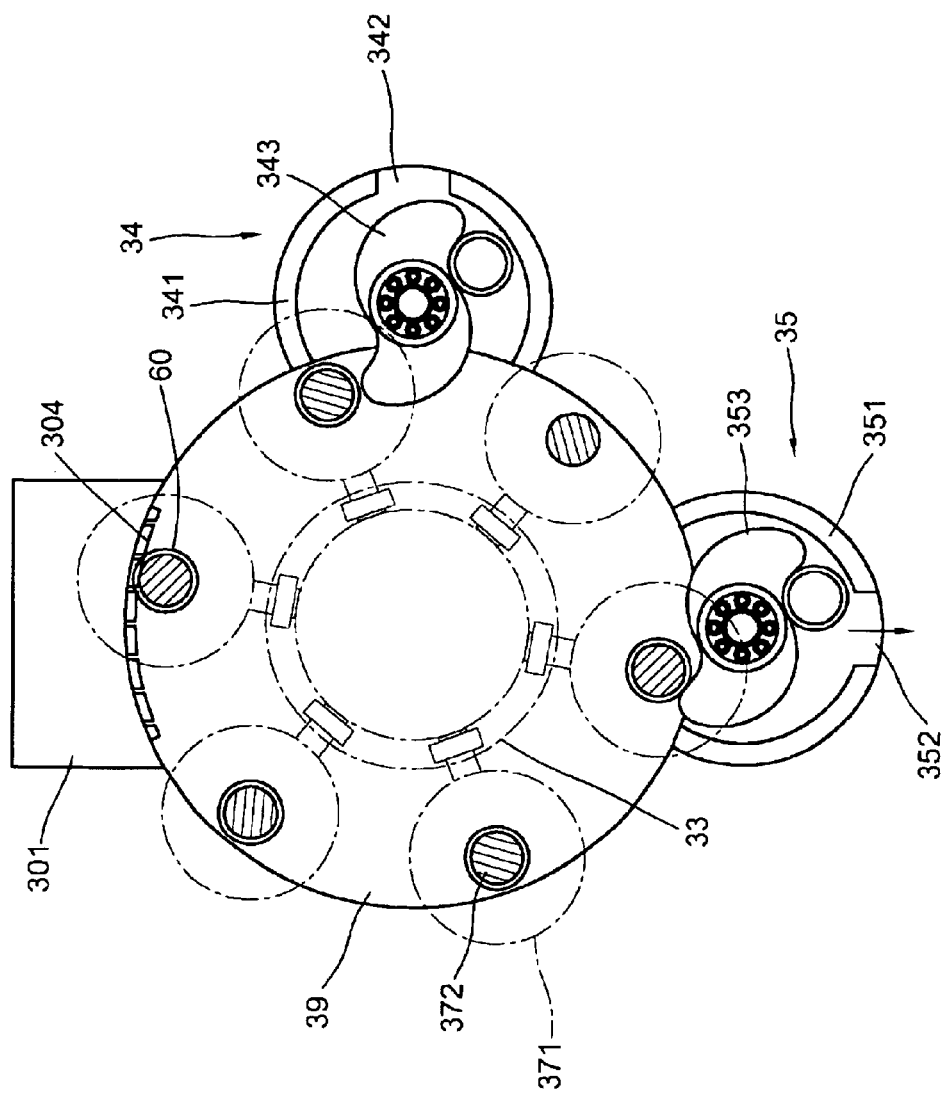
FIG. 6 is a plane view showing the operation of the main mechanism of the machine.
Figure 7:
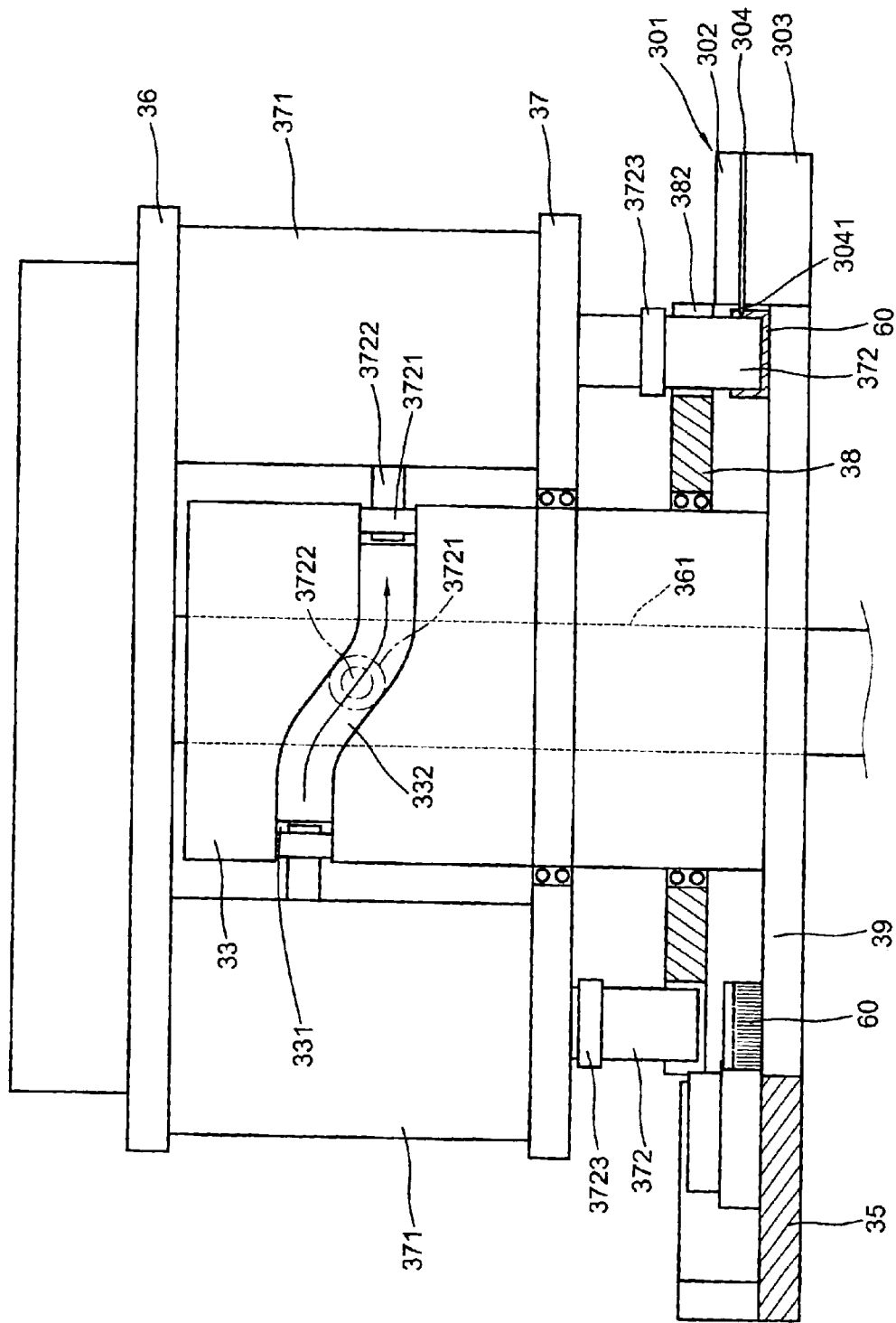
FIG. 7 is a side view showing an annular groove including an inverse U-shaped guide track in the outer periphery of the central shaft.
Figure 8:
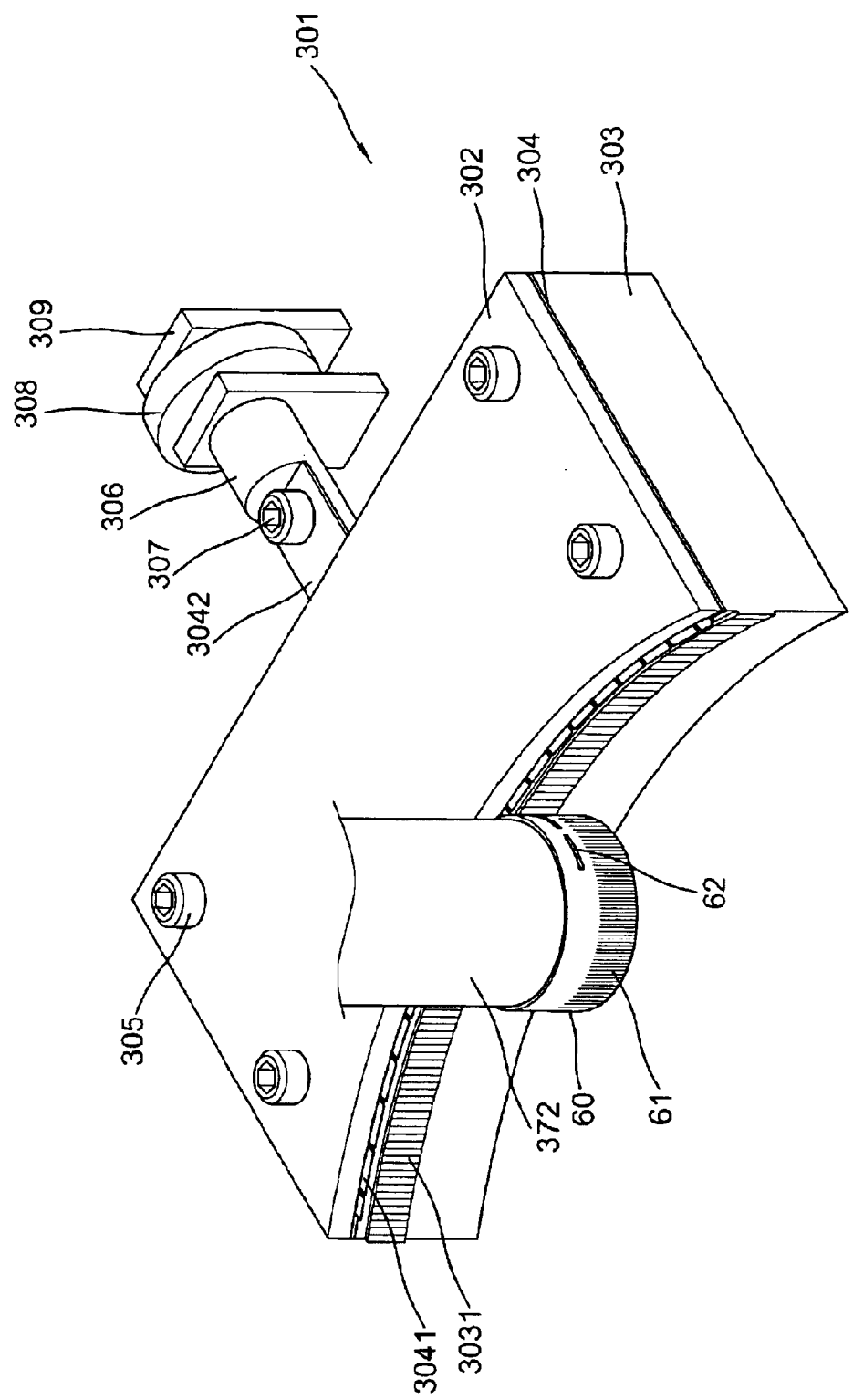
FIG. 8 is a perspective view showing the cutting set is cutting a dashed breaking-line in the twist-off cap.
Figure 9:
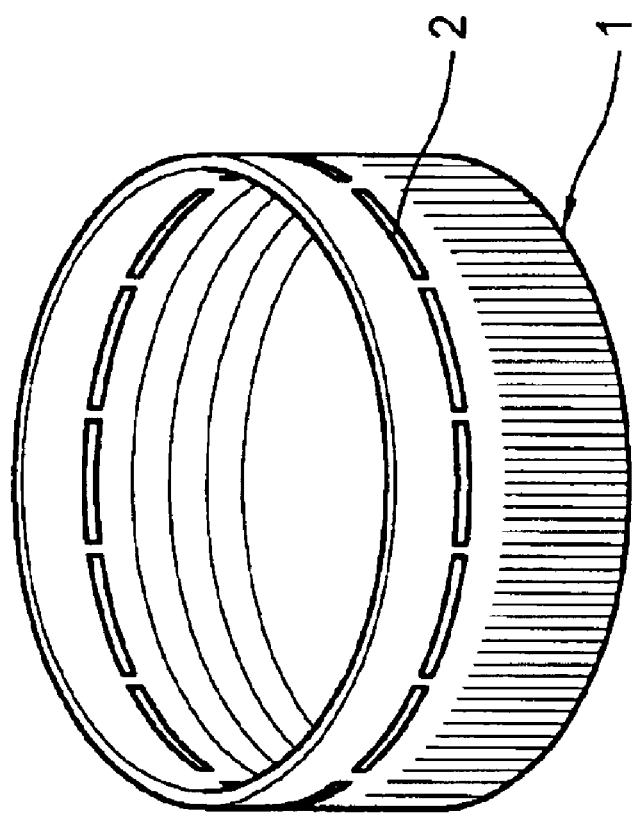
FIG. 9 is a perspective view showing a finished product of the twist-off cap.

The main mechanism 30 comprises a box like rectangular stand 31 on bottom in which is a motor vertically disposed (not shown), a transparent rectangular guard 32 on the top having four doors 321 and each of the doors engages with a sensitive switch 322 which is functioned to temporarily stop the operation of the machine when the door 321 is open in order to prevent the hazard from to be happened, a stationary disk 39 centrally disposed on the top of the stand 31 having a central bore communicated to the stand 31, an input tray 34 integrated with a circumference of the stationary disk 39 having a pair of lateral walls 341, an inlet 342 connected to the inner end of the input guide 20, an outlet toward the main mechanism 30, a double-headed pusher 343 having two symmetrically formed introrsely curved edges and a circular pivot 344 on the center of the double-headed pusher 343 connected to a mini-motor (not shown) on the bottom of the tray 34 to drive the pusher 343 to rotate at predetermined speed (as shown in FIG. 5), to regularly push the caps 60 from the inlet 342 to the outlet on one by one basis, an output tray 35 integrated with a circumference of the stationary disk 39 positioned perpendicular to the input tray 34 and having a pair of lateral walls 351 to define an inlet toward the main mechanism and an outlet 352 connected to one end of the conveyer 40 which conveys the finished caps 60 into the finished-product container 50, a double-headed pusher 353 which has the same shape as that of the double-headed pusher 343 of the input tray 34 and is also secured by a pivot 354 and drived by a mini-motor (not shown) on the bottom of the tray 35 (as shown in FIGS. 1 and 4), to push the finished caps 60 from the inlet to the outlet 352, a cutting set 301 integrated with a circumference of the stationary disk 39 positioned opposite to the output tray 35 and having a cutting plate 304 sandwiched in an upper plate 302 and a lower plate 303 and adjustably secured by bolts 305, both of the plates 302, 303 and 304 having an introrsely curved inner edge wherein the cutting plate 304 has a spaced blade 3041 slightly protruded outward relative to the plates 302 and 303 and four through holes (not shown) for passing through the bolts 305 larger than that of the plates 302 and 303 to facilitate a minute adjustment of the cutting plate 304 and a tail 3042 projected outward from outer edge thereof and the lower plate 303 has a spline 3031 vertically formed on upper edge abutting the spaced blade 3041, a pulling rod 306 having flat fore end connected with the tail 3042 and secured by a bolt 307 and threaded rear end engaged with a minute adjustment button 308 which is held by a pair of rectangular plates 309 (as shown in FIG. 8), the lower plate 303 further having a heater in the bottom (not shown) for heating the cutting plate 304 to a predetermined degree of temperature in order to smoothly cut the caps 60, a tubular central shaft 33 stationary projected upward from a central bore of the stationary disk 39. On an outer periphery of the shaft 33 is an horizontal annular groove 331 having an inverse U-shaped section 332 that begins from the spot in front of the output tray 35 (as shown in FIG. 7) and is ended at a spot in front of the input tray 34 and a spindle 36 rotatably disposed in the central shaft 33 having a lower end connected to the motor (not shown) and an upper end perpendicularly secured to the underside of an upper rotary disk 36, a middle rotary disk 37 which has a plurality of through holes spacedly formed adjacent circumference and a lower rotary disk 38 spacedly and rotatably secured to the outer periphery thereof with a bearing engaged therebetween, wherein the lower rotary disk 38 is smaller than the middle rotary disk 37 and has plurality of slots 382 spacedly formed in the circumference made in registry with the through holes of the middle rotary disk, a plurality of stationary tubular posts 371 spacedly connected between the upper rotary disk 36 and the middle rotary disk 37 abutting their outer circumferences each having an oblong through hole (not shown) vertically formed in inner periphery, a plurality of solid posts spacedly and vertically connected to the middle rotary disk 37 and the lower rotary disk 38 therebetween and positioned alternate with the stationary tubular posts 371 so that both the middle rotary disk 37 and the lower rotary disk 38 can be able to rotate in connect with the upper rotary disk 36 and a plurality of cylindrical rotary posts 372 rotatably and slidably engaged into the stationary tubular posts 371 respectively each of which is driven by a gear train inside the stationary tubular posts 371 (not shown) and has a transverse rod 3721 pivoted to the top thereof through the oblong hole, a bearing 3722 rotatably secured to the free end of the rod 3721 and slidably engaged in the annular groove 331 and the inverse U-shaped section 332, an annular ring 3723 on a lower outer periphery and a lower end engaged within the slot 382 of the lower rotary disk 38. So that the cylindrical rotary posts 372 is rotated clockwise themselves and revolved in concert with the stationary tubular posts 371 and ascendant and then descendent when the transverse rods 3721 slide in the inverse U-shaped section 332 (as shown in FIG. 7).

The finished product container 50 connects to the outlet 352 of the output tray 35 via the conveyer 40 to received the finished twist-off bottle caps 60 therein.

Based on the above discussed structure, in operation, the feeder 10 feeds the semi-finished caps 60 one by one into the input guide 20, if a cap 60 is found upset (the opening of the cap toward downward), the blow-pipe 23 provides the downward air pressure to drop down the cap 60 through the first or second V-shaped through holes 21 and 22 into the opening 12 of the feed-back pipe 11 retaining to the feeder 10 for next chance of feeding, if the cap 60 is qualified (the opening of the cap toward upward), it will be smoothly passed the V-shaped through holes 21 and 22 and pushed by the arms of the rotor 24 to move forward, while the air vents blow the caps to move continuously into the input tray 34 of the main mechanism 30 through the sensor 27 which measures the moving speed and counts the number of the passed caps 60, the double-headed pusher 343 of the input tray 34 pushes the caps 60 one by one from the inlet 342 to the outlet of the tray 34, while a descendent rotary post 372 just reaches to the cap 60 and wraps the cap 60 to its tower end and brings the cap 60 to the cutting set 301 for cutting the dashed breaking-line, due to the introrsely curved inner edge of the cutting plate 304, the vertical stripes of the caps 60 meshed with the spline 3031 on the lower plate 303 and clockwise rotation of the rotary post 372, the cutting result of the dashed breaking-line must be more smooth and qualified, when the rotary post 372 reaches to the output tray 35 and ascents, immediately the cap 60 will be dropped down to the inlet of the output tray 35 due to the stopping by the edge of the slot 382 of the lower rotary disk 38, the double-headed pusher 353 of the output tray 35 then pushes the finished cap 60 out of the outlet 352 and the finished cap 60 conveyed by the conveyer 40 enters into the finished products container 50. The rapid and continuous operation of the machine will produce a large number of qualified twist-off caps 60. According to a practical test, this machine can provide about 500 pieces of qualified twist-off caps 60 per a minute. The introrsely curved inner edge of the cutting set 301, to enlarge the contact area between the cap 60 and cutting plate 304 which is heated to a predetermined degree of temperature, in addition to the minute adjustment device to decide the cutting depth of the dashed breaking-line in the caps 60, the result must be very precise and reliable and the machine is capable of mass production.

The transparent guard 32 enables the operator to watch the operation of the main mechanism and prevents the external objects to intrude into the mechanism.

Its four doors 321 in cooperation with the four sensitive switchs 322 which stop the operation of the whole machine safeguard the safety of the operator. This machine is already worked out and tested repeatedly to prove that the capability is very reliable.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A breaking-line cutting machine for the twist-off bottle cap comprising:

a main mechanism comprising a box like rectangular stand on bottom including a motor vertically disposed therein, a transparent rectangular guard on top having four doors engaged with four sensitive switches on four side thereof, a stationary disk centrally disposed on top of said stand and communicating to said stand, an input tray and an output tray spacedly integrated with a circumference of said stationary disk positioned perpendicular to each other and each having a pair of lateral wall to define an inlet and outlet therebetween and a double-headed pusher rotatably secured to a center of said trays and driven by a mini-motor on bottom of said trays, a cutting set integrated with a circumference of said stationary disk positioned opposite to said output tray and having an introrsely curved inner edge, a cutting plate sandwiched in an upper plate and a lower plate which has spline on upper inner edge and a heater in bottom, said cutting plate having spaced blades on inner edge slightly protruded outward, four enlarged coupling holes and a flat tail centrally projected outward from outer edge connected to a flat portion of a pulling rod having threaded free end engaged with a minute adjustment button which is held by a pair of rectangular plates, a tubular central shaft stationarily projected upward from a central bore of said stationary disk having a horizontal annular groove including an inverse U-shaped section formed in an outer periphery, a spindle rotatably disposed to center of said tubular central shaft having a lower end connected to the motor and an upper end perpendicularly connected to an upper rotary disk, a middle rotary disk which has a plurality of through holes spacedly formed adjacent circumference rotatably secured to a middle portion of said tubular shaft with a bearing engaged therebetween, a lower rotary disk which is smaller than the middle rotary disk and has a plurality of slots spacedly formed around circumference made in registry with the through holes of the middle rotary disk rotatably secured to a lower portion of said shaft with a bearing engaged therebetween, a plurality of stationary tubular posts spacedly and vertically connected said upper rotary disk and said middle rotary disk abutting their circumferences having their lower ends respectively engaged with the through holes of said middle rotary disk and each having a oblong through holes vertically formed in an inner periphery, a plurality of solid posts spacedly and vertically connected said middle rotary disk and said lower rotary disk therebetween abutting their circumferences and positioned alternate to the stationary tubular posts and a plurality of cylindrical rotary posts rotatably and slidably disposed into said stationary tubular posts respectively and driven by gear trains inside said tubular posts and each having a transverse rod pivoted to top, an annular ring on lower periphery and a lower end engaged into the slots of said lower rotary disk respectively, said transverse rod each has a bearing on inner end slidably engaged into said annular groove and said inverse U-shaped section;

a semi-finished product feeder connected to the inlet of said input tray via an input guide, a feed-back pipe connected to an upper periphery of said feeder having an opening in free end positioned under the input guide, said input guide having a first and a second V-shaped through holes spacedly formed above the opening of said feed-back pipe, a blow-pipe above said first V-shaped through hole and toward downward, a rotor rotatably disposed above said second V-shaped through hole having six radial arms of predetermined length, a plurality of U-shaped air vents centrally formed spaced apart in bottom thereof, an air transmission pipe on underside communicating to said U-shaped air vents and a sensor on a top thereof;

a finished product container connected the outlet of said output tray via a conveyer receives finished twist-off bottle caps therein.

2. The cutting machine as recited in claim 1 wherein said inverse U-shaped section of said horizontal annular groove begins at a spot in front of said output tray and ends at a spot in front of said input tray.

3. The cutting machine as recited in claim 1 wherein said rotary disks are rotated counterclockwise.

4. The cutting machine as recited in claim 1 wherein said cylindrical rotary posts, said double headed pushers and said rotor are rotated clockwise.

5. The cutting machine as recited in claim 1 wherein said cutting plate is heated to a predetermined degree of temperature.

6. The cutting machine as recited in claim 1 wherein said sensitive switch on said transparent guard is functioned to stop the machine when said door is open.

* * * * *